(12) United States Patent
Harris (10) Patent No.: US 12,238,841 B2
(45) Date of Patent: Feb. 25, 2025

(54) LIGHTING CONTROL ASSEMBLY

(71) Applicant: John Harris, Cottonwood, AZ (US)

(72) Inventor: John Harris, Cottonwood, AZ (US)

( * ) Notice: Subject to any disclaimer, the term of this patent is extended or adjusted under 35 U.S.C. 154(b) by 151 days.

(21) Appl. No.: 18/131,764

(22) Filed: Apr. 6, 2023

(65) Prior Publication Data

US 2024/0341024 A1    Oct. 10, 2024

(51) Int. Cl.
*H05B 47/17* (2020.01)
*H05B 47/105* (2020.01)
*H02S 20/23* (2014.01)

(52) U.S. Cl.
CPC .......... *H05B 47/17* (2020.01); *H05B 47/105* (2020.01); *H02S 20/23* (2014.12)

(58) Field of Classification Search
CPC ........ H05B 47/17; H05B 47/105; H02S 20/23
See application file for complete search history.

(56) References Cited

U.S. PATENT DOCUMENTS

| | | | |
|---|---|---|---|
| 7,736,014 B2 | 6/2010 | Blomberg | |
| 9,360,182 B2 | 6/2016 | Wemmer | |
| 9,777,900 B2 | 10/2017 | Hansson | |
| 9,879,842 B2 | 1/2018 | Orfield | |
| 10,368,498 B1 | 8/2019 | Chou | |
| 10,883,685 B2 | 1/2021 | Di Trapani | |
| 11,579,235 B2 * | 2/2023 | Adest | H02M 7/44 |
| 2016/0018598 A1 | 1/2016 | Hansson | |
| 2017/0012578 A1 * | 1/2017 | Estes | H01L 31/02021 |
| 2017/0238401 A1 * | 8/2017 | Sadwick | A61N 5/0618 |
| | | | 315/294 |
| 2020/0260556 A1 * | 8/2020 | Rozbicki | H05B 47/11 |
| 2021/0080071 A1 | 3/2021 | Al-Ani | |
| 2022/0404056 A1 * | 12/2022 | Bloemer | F24F 11/58 |

FOREIGN PATENT DOCUMENTS

WO    WO2018231228    12/2018

* cited by examiner

*Primary Examiner* — Minh D A (57) ABSTRACT

A lighting control assembly includes a solar collector that is integrated into a roof of a building to collect sunlight. A light transmission unit is integrated into the building to receive the sunlight from the solar collector. A control panel is attached to the building to receive the sunlight from the light transmission unit. A plurality of switch receivers is each integrated into the building. Each of the switch receivers receives the sunlight and artificial light from the light transmission unit. A plurality of switches is each positioned in a respective room of the building and the switch receiver associated with a respective one of the switches is actuated into the on condition when the respective switch is turned on. A plurality of light fixtures is mounted in a respective room in the building for illuminating the respective room when a respective switch receiver is actuated into the on condition.

18 Claims, 6 Drawing Sheets

LIGHTING CONTROL ASSEMBLY

(b) CROSS-REFERENCE TO RELATED APPLICATIONS

Not Applicable

(c) Statement Regarding Federally Sponsored Research or Development

Not Applicable

(d) the Names of the Parties to a Joint Research Agreement

Not Applicable

(e) Incorporation-by-Reference of Material Submitted on a Compact Disc or as a Text File Via the Office Electronic Filing System Not Applicable

(f) Statement Regarding Prior Disclosures by the Inventor or Joint Inventor

Not Applicable

(g) Background of the Invention

(1) FIELD OF THE INVENTION

The disclosure relates to lighting devices and more particularly pertains to a new lighting device for lighting a building with a mixture of sunlight and artificial light. The device includes a solar collected mounted on a roof of a building and a control panel integrated into the building which receives sunlight from the solar collector. The device includes a light emitter that is integrated into the control panel for mixing artificial light with sunlight. The device includes a plurality of switch receivers that each receives the mixture of sunlight and artificial light from the control panel. Additionally, the device includes a plurality of switches and a plurality of light fixtures that each receives the mixture of sunlight and artificial light from a respective switch receiver for illuminating the building.

(2) DESCRIPTION OF RELATED ART INCLUDING INFORMATION DISCLOSED UNDER 37 CFR 1.97 and 1.98

The prior art relates to lighting devices including a variety of lighting devices that each collects and subsequently distributes sunlight through fiber optic cables to an emitter for emitting either pure sunlight or a mixture of sunlight and artificial light and the prior art relates to an improved solar collector for collecting and concentrating sunlight. In no instance does the prior art disclose a lighting system that employs a control panel to send a mixture of sunlight and artificial light to selected light fixtures in rooms of a building with switch receives that employ shutters for either blocking light or passing light.

(h) Brief Summary of the Invention

An embodiment of the disclosure meets the needs presented above by generally comprising a solar collector that is integrated into a roof of a building to collect sunlight. A light transmission unit is integrated into the building to receive the sunlight from the solar collector. A control panel is attached to the building to receive the sunlight from the light transmission unit. A plurality of switch receivers is each integrated into the building. Each of the switch receivers receives the sunlight and artificial light from the light transmission unit. A plurality of switches is each positioned in a respective room of the building and the switch receiver associated with a respective one of the switches is actuated into the on condition when the respective switch is turned on. A plurality of light fixtures is mounted in a respective room in the building for illuminating the respective room when a respective switch receiver is actuated into the on condition. There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
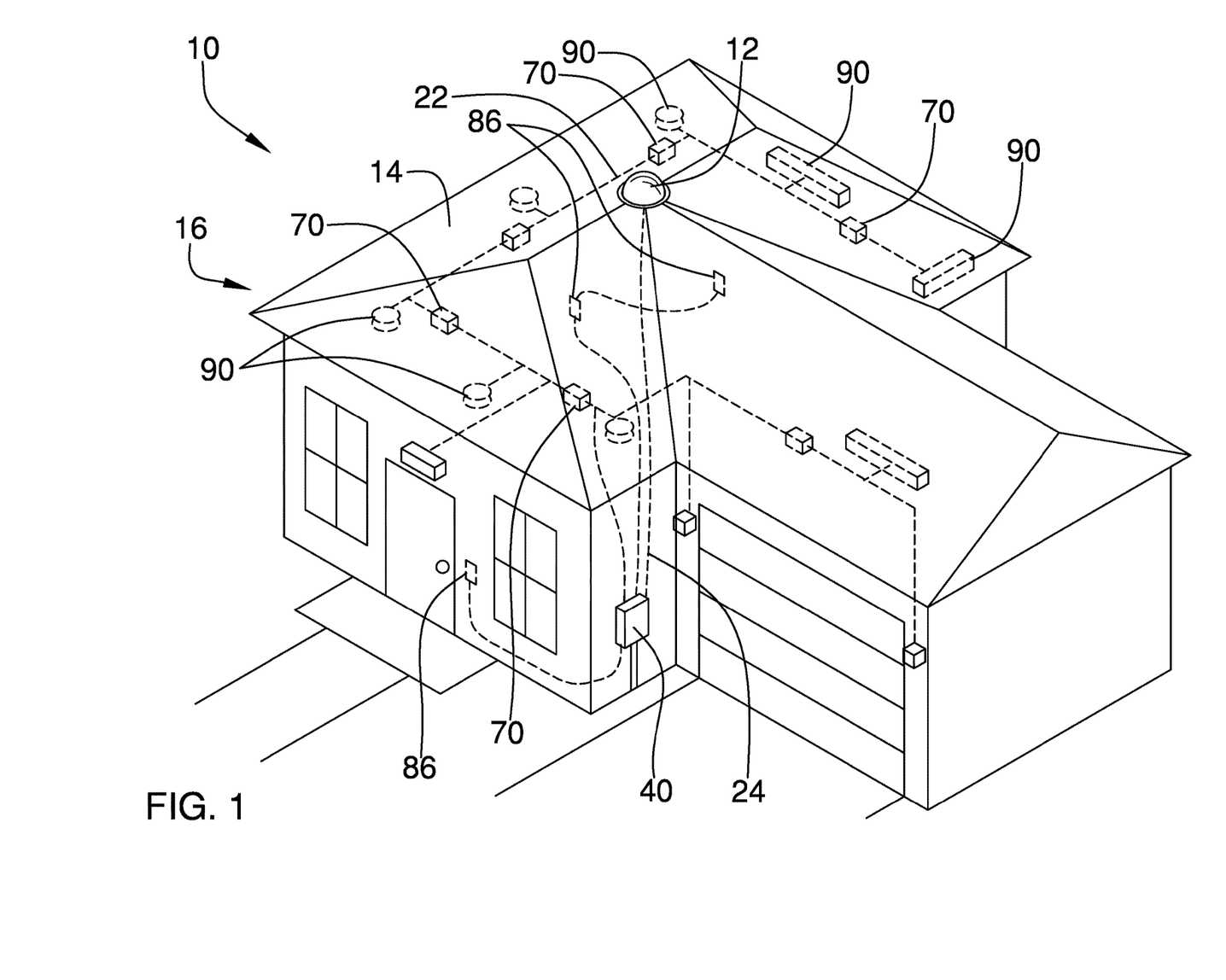
FIG. 1 is a phantom perspective view of a lighting control assembly according to an embodiment of the disclosure.
Figure 2:
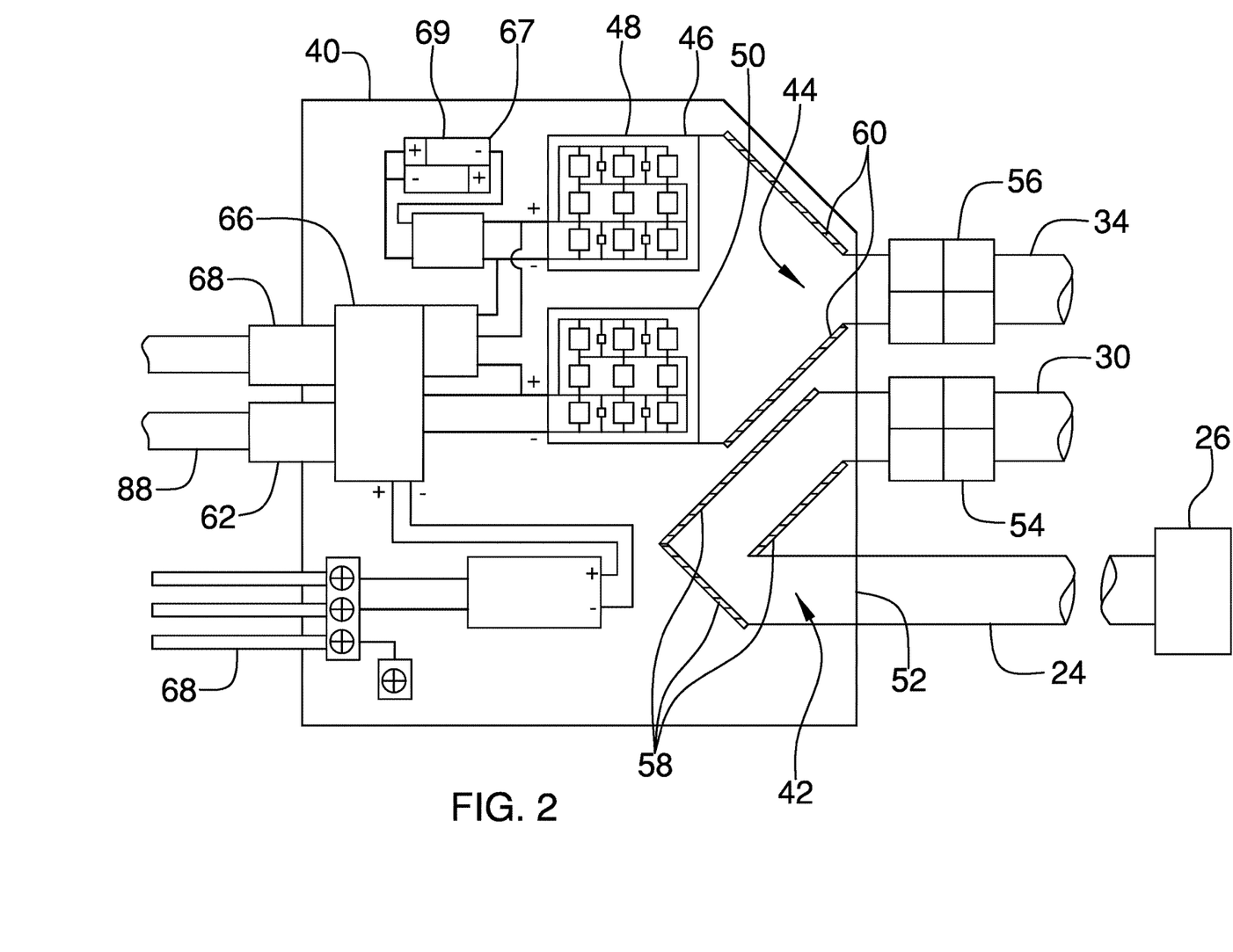
FIG. 2 is an interior view of a control panel of an embodiment of the disclosure.
Figure 3:
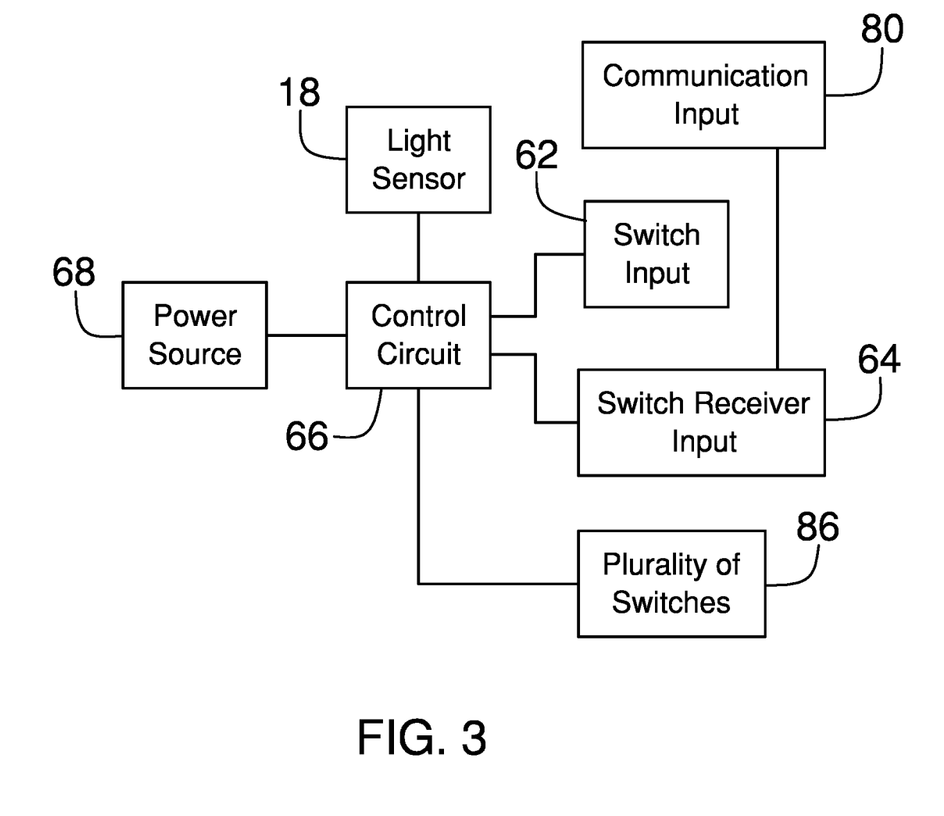
FIG. 3 is a schematic view of an embodiment of the disclosure.
Figure 4:
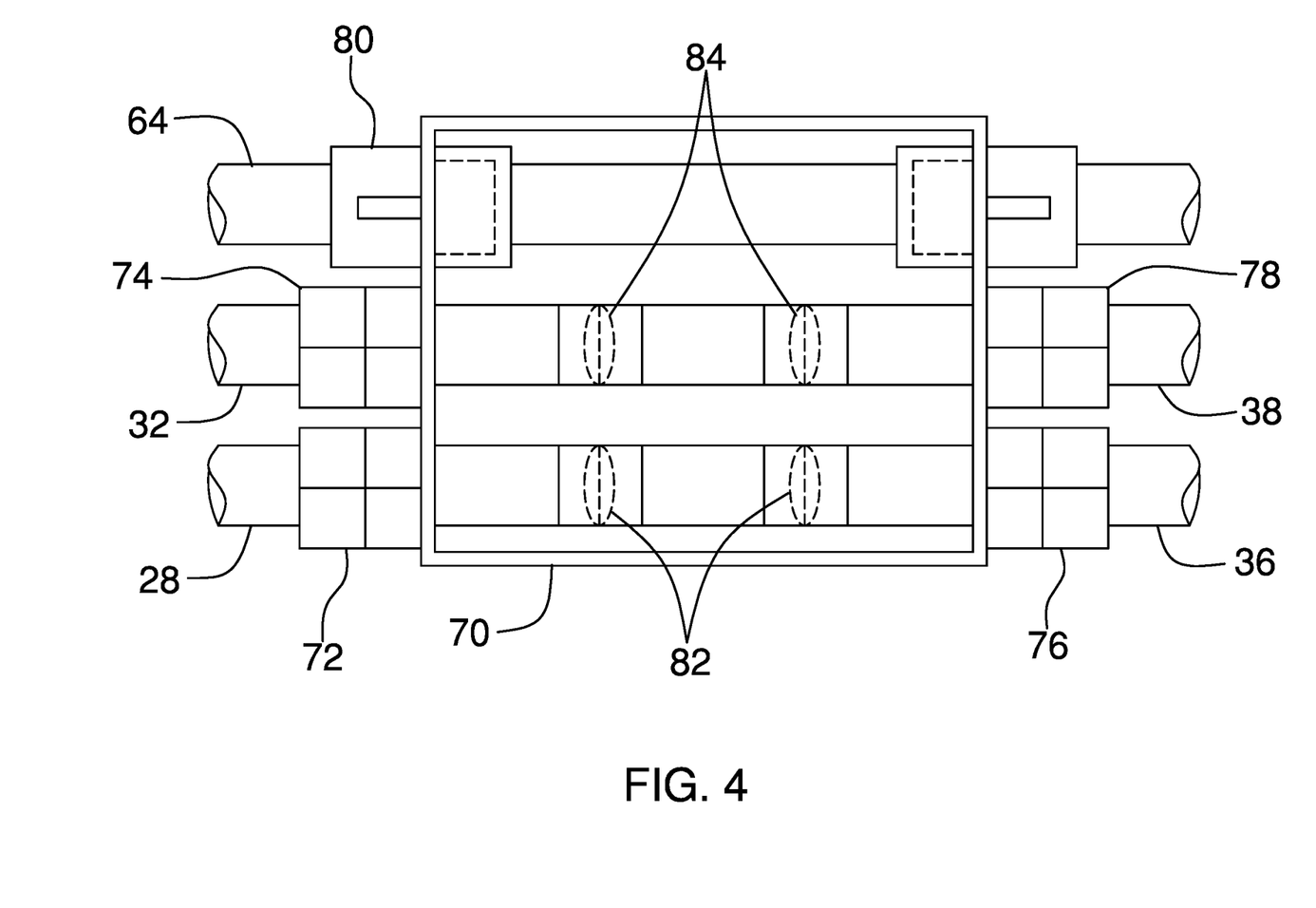
FIG. 4 is an interior view of switch receiver of an embodiment of the disclosure.
Figure 5:
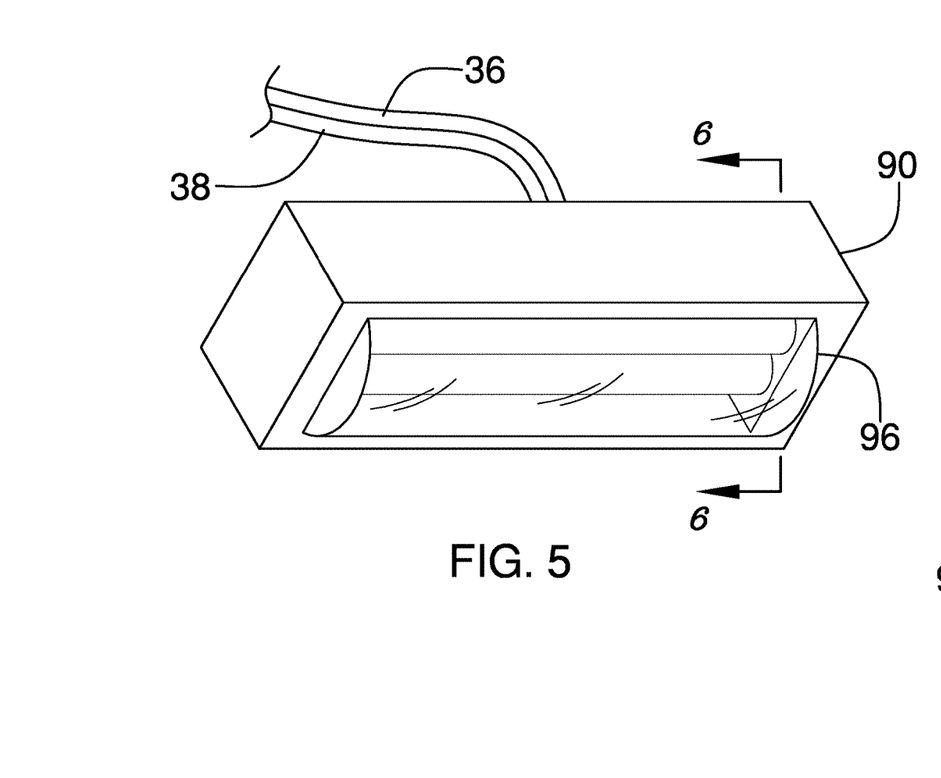
FIG. 5 is a perspective view of a light fixture of an embodiment of the disclosure.
Figure 6:
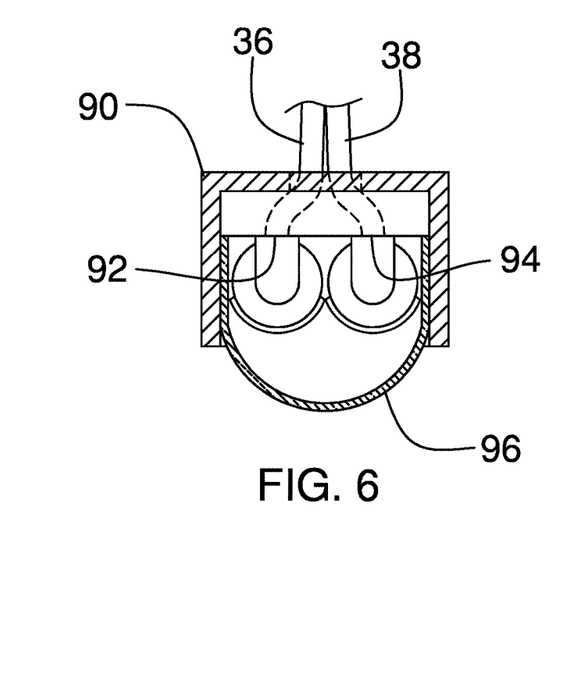
FIG. 6 is a cross sectional view taken along line 6-6 of FIG. 5 of an embodiment of the disclosure.
Figure 7:
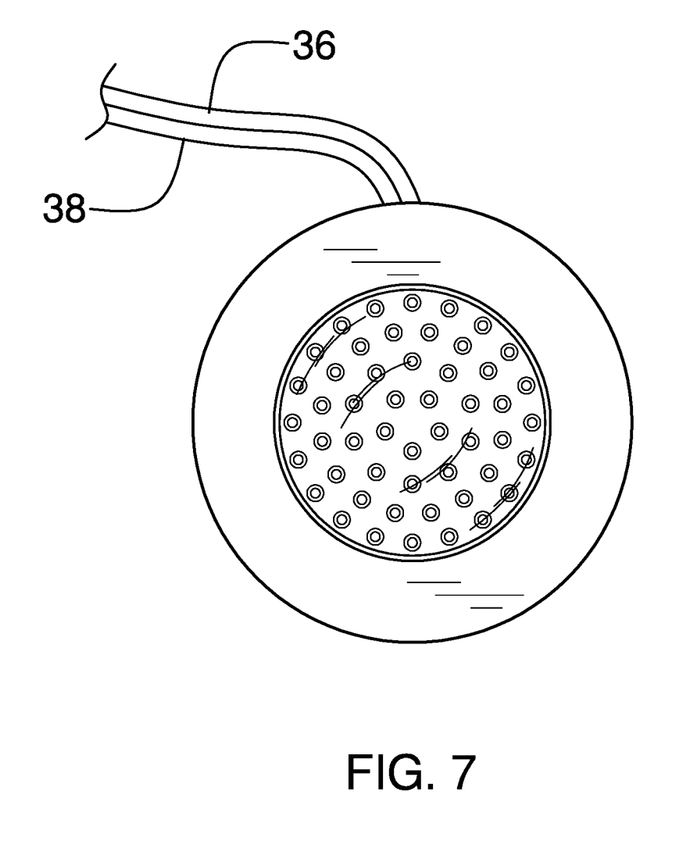
FIG. 7 is a front view of a light fixture of an embodiment of the disclosure.

With reference now to the drawings, and in particular to FIGS. 1 through 7 thereof, a new lighting device embodying the principles and concepts of an embodiment of the disclosure and generally designated by the reference numeral 10 will be described.

As best illustrated in FIGS. 1 through 7, the lighting control assembly 10 generally comprises a solar collector 12 that is integrated into a roof 14 of a building 16 to collect sunlight. The solar collector 12 includes a light sensor 18 for sensing sunlight. The building 16 may be a house, an apartment building or any other type of occupancy. Additionally, the solar collector 12 may have a fisheye lens 20 to maximize the intensity of sunlight that is collected by the solar collector 12.

A light transmission unit 22 is integrated into the building 16 and the light transmission unit 22 is in communication with the solar collector 12 to receive the sunlight from the solar collector 12. The light transmission unit 22 includes a trunk line 24 that is coupled to an output 26 of the solar collector 12 such that the trunk line 24 receives the sunlight. The trunk line 24 is comprised of a light transmitting material to transmit the sunlight along the trunk line 24. The light transmission unit 22 includes a plurality of solar lines 28 and the plurality of solar lines 28 has a common input 30. Each of the plurality of solar lines 28 is integrated into the building 16 and each of the plurality of solar lines 28 is comprised of a light transmitting material to transmit light. The light transmission unit 22 includes a plurality of artificial lines 32 that each has a common input 34 and each of the plurality of artificial lines 32 is integrated into the building 16. Additionally, each of the plurality of artificial lines 32 is comprised of a light transmitting material to transmit light.

The light transmission unit 22 includes a plurality of first supply lines 36 that is each integrated into the building 16. Each of the plurality of first supply lines 36 is comprised of a light transmitting material to transmit light. The light transmission unit 22 includes a plurality of second supply lines 38 that is each integrated into the building 16. Each of the plurality of second supply lines 38 is comprised of a light transmitting material to transmit light. Furthermore, the trunk line 24, each of the plurality of solar lines 28, each of said plurality of artificial lines 32, each of the first supply lines 36 and each of the second supply lines 38 may comprise a fiber optic cable or other similar device that is capable of transmitting light over a great distance with minimal signal loss.

A control panel 40 is attached to the building 16 and the control panel 40 has a solar pathway 42 and an artificial pathway 44. The solar pathway 42 is in communication with the light transmission unit 22 to receive the sunlight from the solar collector 12. A light emitter 46 is integrated within the control panel 40 to emit artificial light within the control panel 40. Additionally, the light emitter 46 is in communication with the artificial pathway 44 such that the artificial pathway 44 receives the artificial light from the light emitter 46. The artificial pathway 44 is in communication with the light transmission unit 22 such that the light transmission unit 22 receives the artificial light from the light emitter 46. Furthermore, the light emitter 46 may comprise a light emitting diode or the like that emits visible light of a spectrum that simulates natural sunlight. A pair of the light emitters 46 may be provided, which includes a back-up light emitter 48 for a primary light emitter 50 in the event that the primary light emitter 50 fails.

The control panel 40 has a solar input 52, a solar output 54 and an artificial output 56. The solar pathway 42 is in electromagnetic communication between the solar input 52 and the solar output 54. Additionally, the artificial pathway 44 is in electromagnetic communication with the artificial output 56. Each of the solar input 52, the solar output 54 and the artificial output 56 may comprise a fiber optic port or other similar device that can transmit light. The solar pathway 42 includes a series of first mirrors 58 disposed within the control panel 40. The series of first mirrors 58 is strategically oriented for reflecting light from the solar input 52 to the solar output 54. The artificial pathway 44 includes a series of second mirrors 60 disposed within the control panel 40. The series of second mirrors 60 is strategically oriented for reflecting light from the light emitter 46 to the artificial output 56.

The trunk line 24 associated with the light transmission unit 22 is coupled to the solar input 52 such that the trunk line 24 is in electromagnetic communication with the solar pathway 42. In this way the solar pathway 42 receives the sunlight from the solar collector 12. The common input of the plurality of solar lines 28 associated with the light transmission unit 22 is coupled to the solar output 54 such that the plurality of solar lines 28 is in electromagnetic communication with the solar pathway 42. In this way the plurality of solar lines 28 receives the sunlight from the solar collector 12. The common input of the plurality of artificial lines 32 associated with the light transmission unit 22 is coupled to the artificial output 56 such that the plurality of artificial lines 32 is in electromagnetic communication with the artificial pathway 44. In this way the plurality of artificial lines 32 receives the light from the light emitter 46.

The control panel 40 has a switch input 62 and the control panel 40 has a switch receiver input 64. The control panel 40 has a control circuit 66 that is integrated into the control panel 40 and the control circuit 66 is electrically coupled to a power source 68 comprising an electrical system of the building 16. Furthermore, the control circuit 66 is electrically coupled to each of the switch input 62, the switch receiver input 64, the light emitter 46 and the light sensor 18 in the solar collector 12. The control circuit 66 receives a solar input when the light sensor 18 senses sunlight and the control circuit 66 receives a mixture input when the light sensor 18 senses sunlight that is below a pre-determined intensity. Additionally, the control circuit 66 receives an artificial input when the light sensor 18 does not sense sunlight and the control circuit 66 receives an actuate input.

The light emitter 46 is turned off when the control circuit 66 receives the solar input. The light emitter 46 is turned on to a pre-determined intensity that is less than a full intensity of the light emitter 46 when the control circuit 66 receives the mixture input. Additionally, the light emitter 46 is turned on to full intensity when the control circuit 66 receives the artificial input. The control panel 40 includes a power supply 67 that is mounted within the control panel 40 which comprises at least one battery 69, electrically coupled to the control circuit 66, for supplying emergency back-up power to the control circuit 66.

A plurality of switch receivers 70 is provided and each of the switch receivers 70 is integrated into the building 16 at strategic locations in the building 16. Each of the switch receivers 70 is in communication with the light transmission unit 22 to receive the sunlight and the artificial light from the light transmission unit 22. Additionally, each of the switch receivers 70 is in communication with the control panel 40. Each of the switch receivers 70 is actuatable between an on condition and an off condition; each of the plurality of switch receivers 70 is normally actuated into the off condition.

Each of the plurality of switch receivers 70 has a solar input 72, an artificial input 74, a solar output 76, an artificial output 78 and a communication input 80. Each of the switch receivers 70 has a plurality of solar shutters 82 in communication between the solar input 72 and the solar output 76 of a respective switch receiver 70. Additionally, each of the switch receivers 70 has a plurality of artificial shutters 84 in communication between the artificial input 74 and the artificial output 78 of a respective switch receiver 70. The communication input 80 of each of the plurality of switch receivers 70 is electrically coupled to the switch receiver input 64 of the control panel 40.

Each of the plurality of solar shutters 82 associated with the respective switch receiver 70 is actuated into an open condition when the control circuit 66 receives the actuate input and the control circuit 66 receives the solar input. In this way the plurality of solar shutters 82 associated with the respective switch receiver 70 passes sunlight through the respective switch receiver 70. Each of the artificial shutters 84 associated with a respective one of the switch receivers 70 is actuated into an open condition when the control circuit 66 receives the actuate input and the control circuit 66 receives either of the mixture input or the artificial input. In this way the respective switch receiver 70 passes the artificial light through the respective switch receiver 70. Furthermore, each of the plurality of solar shutters 82 and each of the plurality of artificial shutters 84 may comprise an electromechanical shutter that can either block light or pass light.

Each of the plurality of solar shutters 82 in a respective one of the switch receivers 70 is in communication between the solar input 72 and the solar output 76 of the respective switch receiver 70. Additionally, each of the plurality of artificial shutters 84 in a respective one of the switch receivers 70 is in communication between the artificial input 74 and the artificial output 78 of the respective switch receiver 70. The communication input 80 of a respective one of the switch receivers 70 is electrically coupled to each of the plurality of solar shutters 82 and each of the plurality of artificial shutters 84 in the respective switch receiver 70. Each of the plurality of solar lines 28 associated with the light transmission unit 22 is coupled to the solar input 72 of a respective one of the switch receivers 70 such that each of the plurality of solar lines 28 is in electromagnetic communication with the solar input 72 of the respective switch receiver 70. In this way each of the plurality of switch receivers 70 receives the sunlight from the solar collector 12. Each of the plurality of artificial lines 32 associated with the light transmission unit 22 is coupled to the artificial input 74 of a respective one of the switch receivers 70 such that each of the plurality of artificial lines 32 is in electromagnetic communication with the artificial input 74 of the respective switch receiver 70. In this way each of the plurality of switch receivers 70 is configured to receive the sunlight from the artificial collector.

Each of the first supply lines 36 associated with the light transmission unit 22 is coupled to the solar output 76 of a respective one of the switch receivers 70 such that each of the first supply lines 36 is in electromagnetic communication with the solar output 76 of the respective switch receiver 70. In this way each of the first supply lines 36 receives the sunlight from the solar collector 12. Each of the second supply lines 38 associated with the light transmission unit 22 is coupled to the solar output 76 of a respective one of the switch receivers 70 such that each of the second supply lines 38 is in electromagnetic communication with the solar output 76 of the respective switch receiver 70. In this way each of the second supply lines 38 receives the sunlight from the solar collector 12.

A plurality of switches 86 is provided and each of the plurality of switches 86 is positioned in a respective room 87 of the building 16 thereby facilitating each of the plurality of switches 86 to be manipulated. Each of the plurality of switches 86 is in communication the control panel 40 and each of the plurality of switches 86 is in communication with a respective one of the switch receivers 70. The switch receiver 70 associated with a respective one of the switches 86 is actuated into the on condition when the respective switch 86 is turned on. Each of the plurality of switches 86 has an output 88 and the output 88 of each of plurality of switches 86 is electrically coupled to the switch input 62 on the control panel 40. The control circuit 66 in the control panel 40 receives the actuate input when any of the plurality of switches 86 is turned on. The plurality of solar shutters 82 and the plurality of artificial shutters 84 in the switch receiver 70 associated with the switch 86 that is turned on is actuated into the open condition based on lighting conditions determined by the control panel 40. In this way the switch receiver 70 associated with the switch 86 that is turned on directs the sunlight or the artificial light into a respective first supply line 36 and a respective second supply line 38 associated with the light transmission unit 22.

A plurality of light fixtures 90 is provided and each of the light fixtures 90 is mounted in a respective room 87 in the building 16. Each of the plurality of light fixtures 90 is in communication with a respective one of the switch receivers 70. In this way each of the plurality of light fixtures 90 receives the sunlight and the artificial light from the respective switch receiver 70. Thus, the respective room 87 is illuminated when the respective switch receiver 70 is actuated into the on condition. As is most clearly shown in FIGS. 5 and 6, each of the light fixtures 90 may comprise an elongated fixture similar to a fluorescent light fixture. As is most clearly shown in FIG. 7, each of the plurality of light fixtures 90 may comprise a circular fixture similar to a can light.

Each of the light fixtures 90 has a first input 92 and a second input 94. The first input 92 of each of the light fixtures 90 is coupled to a respective one of the first supply lines 36 associated with the light transmission unit 22 such that first input 92 of each of the light fixtures 90 is in electromagnetic communication with the respective switch receiver 70. In this way each of the plurality of light fixtures 90 receives the sunlight from the respective switch receiver 70. The second input 94 of each of the light fixtures 90 is coupled to a respective one of the second supply lines 38 associated with the light transmission unit 22 such that second input 94 of each of the light fixtures 90 is in electromagnetic communication with the respective switch receiver 70. In this way each of the plurality of light fixtures 90 receives the artificial from the respective switch receiver 70. Each of the plurality of light fixtures 90 has a lens 96 is in electromagnetic communication with each of the first input 92 and the second input 94 to emit the sunlight and the artificial light into the respective room 87 to illuminate the respective room 87.

In use, the control panel 40 mixes the appropriate amount of artificial light with the sunlight to supply the light transmission unit 22 with the desired intensity of light. The switch in a respective room 87 is turned on to illuminate the respective room 87 and the switch receiver 70 associated with the switch in the respective room 87 is actuated into the on condition. In this way the switch receiver sends the light from the control panel 40 into the light fixture that is associated with the switch in the respective room 87. In this way the respective room 87 can be illuminated with a mixture of sunlight and artificial light. Furthermore, every room 87 in the building 16 can be illuminated with light from the light emitter 46 in the control panel 40 during night time and during low sunlight hours thereby decreasing overall energy consumption associated with lighting a building 16. Every room 87 in the building 16 can be illuminated with sunlight from the control panel 40 during periods of high sunlight thereby eliminating energy consumption associated with lighting a building 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lighting control assembly for mixing solar light and artificial light for illuminating rooms in a building, said assembly comprising:

a solar collector being integrated into a roof of a building wherein solar collector said is configured to collect sunlight;

a light transmission unit being integrated into said building, said light transmission unit being in communication with said solar collector wherein said light transmission unit is configured to receive the sunlight from said solar collector;

a control panel being attached to said building, said control panel having a solar pathway and an artificial pathway, said solar pathway being in communication with said light transmission unit wherein said solar pathway is configured to receive the sunlight from said solar collector, said control panel having a light emitter being integrated within said control panel wherein said light emitter is configured to emit artificial light within said control panel, said light emitter being in communication with said artificial pathway wherein said artificial pathway is configured to receive the artificial light from said light emitter, said artificial pathway being in communication with said light transmission unit wherein said light transmission unit is configured to receive the artificial light from said light emitter;

a plurality of switch receivers, each of said switch receivers being integrated into said building at strategic locations in said building, each of said switch receivers being in communication with said light transmission unit wherein each of said plurality of switch receivers is configured to receive the sunlight and the artificial light from said light transmission unit, each of said switch receivers being in communication with said control panel, each of said switch receivers being actuatable between an on condition and an off condition, each of said plurality of switch receivers being normally actuated into said off condition;

a plurality of switches, each of said plurality of switches being positioned in respective room of said building thereby facilitating each of said plurality of switches to be manipulated, each of said plurality of switches being in communication said control panel, each of said plurality of switches being in communication with a respective one of said switch receivers, said switch receiver associated with a respective one of said switches being actuated into said on condition when said respective switch is turned on; and a plurality of light fixtures, each of said light fixtures being mounted in a respective room in said building, each of said plurality of light fixtures being in communication with a respective one of said switch receivers wherein each of said plurality of light fixtures is configured to receive the sunlight and the artificial light from said respective switch receiver for illuminating said respective room when said respective switch receiver is actuated into said on condition.

2. The assembly according to claim 1, wherein said light transmission unit includes:

a trunk line being coupled to an output of said solar collector wherein said trunk line is configured to receive the sunlight, said trunk line being comprised of a light transmitting material wherein said trunk line is configured to transmit the sunlight along said trunk line;

a plurality of solar lines, said plurality of solar lines having a common input, each of said plurality of solar lines being integrated into said building, each of said plurality of solar lines being comprised of a light transmitting material wherein each of said plurality of solar lines is configured to transmit light;

a plurality of artificial lines, each of said plurality of artificial lines having a common input, each of said plurality of artificial lines being integrated into said building, each of said plurality of artificial lines being comprised of a light transmitting material wherein each of said plurality of artificial lines is configured to transmit light;

a plurality of first supply lines, each of said plurality of first supply lines being integrated into said building, each of said plurality of first supply lines being comprised of a light transmitting material wherein each of said plurality of first supply lines is configured to transmit light; and a plurality of second supply lines, each of said plurality of second supply lines being integrated into said building, each of said plurality of second supply lines being comprised of a light transmitting material wherein each of said plurality of second supply lines is configured to transmit light.

3. The assembly according to claim 1, wherein:

said control panel has a solar input and a solar output and an artificial output;

said solar pathway is in electromagnetic communication between said solar input and said solar output;

said artificial pathway is in electromagnetic communication with said artificial output;

said solar pathway includes a series of first mirrors being disposed within said control panel, said series of first mirrors being strategically oriented for reflecting light from said solar input to said solar output; and said artificial pathway includes a series of second mirrors being disposed within said control panel, said series of second mirrors being strategically oriented for reflecting light from said light emitter to said artificial output.

4. The assembly according to claim 3, wherein:

said light transmission unit includes a trunk line;

said trunk line is coupled to said solar input such that said trunk line is in electromagnetic communication with said solar pathway wherein said solar pathway is configured to receive the sunlight from said solar collector.

5. The assembly according to claim 3, wherein:
said light transmission unit includes a plurality of solar lines having a common input; and
said common input of said plurality of solar lines associated with said light transmission unit is coupled to said solar output such that said plurality of solar lines is in electromagnetic communication with said solar pathway wherein said plurality of solar lines is configured to receive the sunlight from said solar collector.

6. The assembly according to claim 3, wherein:
said light transmission unit includes a plurality of artificial lines having a common input; and
said common input of said plurality of artificial lines associated with said light transmission unit is coupled to said artificial output such that said plurality of artificial lines is in electromagnetic communication with said artificial pathway wherein said plurality of artificial lines is configured to receive the light from said light emitter.

7. The assembly according to claim 1, wherein:
said solar collector includes a light sensor being configured to sense sunlight;
said control panel has a switch input;
said control panel has a switch receiver input; and
said control panel has a control circuit being integrated into said control panel, said control circuit being electrically coupled to a power source comprising an electrical system of said building, said control circuit being electrically coupled to each of said switch input and said switch receiver input, said control circuit being electrically coupled to said light emitter, said control circuit being electrically coupled to said light sensor in said solar collector.

8. The assembly according to claim 7, wherein:
said control circuit receives a solar input when said light sensor senses sunlight;
said control circuit receives a mixture input when said light sensor senses sunlight that is below a pre-determined intensity;
said control circuit receives an artificial input when said light sensor does not sense sunlight;
said control circuit receives an actuate input;
said light emitter is turned off when said control circuit receives said solar input;
said light emitter is turned on to a pre-determined intensity that is less than a full intensity of said light emitter when said control circuit receives said mixture input; and
said light emitter is turned on to said full intensity when said control circuit receives said artificial input.

9. The assembly according to claim 8, wherein:
each of said plurality of switch receivers has a solar input and an artificial input;
each of said plurality of switch receivers has a solar output and an artificial output;
each of said switch receivers has a communication input, said communication input of each of said plurality of switch receivers is electrically coupled to said switch receiver input of said control panel;
each of said switch receivers has a plurality of solar shutters being in communication between said solar input and said solar output of a respective switch receiver; and
each of said switch receivers has a plurality of artificial shutters being in communication between said artificial input and said artificial output of a respective switch receiver.

10. The assembly according to claim 9, wherein each of said plurality of solar shutters associated with said respective switch receiver is actuated into an open condition when said control circuit receives said actuate input and said control circuit receives said solar input wherein said plurality of solar shutters associated with said respective switch receiver is configured to pass sunlight through said respective switch receiver.

11. The assembly according to claim 9, wherein each of said artificial shutters associated with a respective one of said switch receivers is actuated into an open condition when said control circuit receives said actuate input and said control circuit receives either of said mixture input or said artificial input wherein said respective switch receiver is configured to pass the artificial light through said respective switch receiver.

12. The assembly according to claim 9, wherein:
each of said plurality of solar shutters in a respective one of said switch receivers is in communication between said solar input and said solar output of said respective switch receiver;
each of said plurality of artificial shutters in a respective one of said switch receivers is in communication between said artificial input and said artificial output of said respective switch receiver; and
said communication input of a respective one of said switch receivers is electrically coupled to each of said plurality of solar shutters and each of said plurality of artificial shutters in said respective switch receiver.

13. The assembly according to claim 9, wherein:
said light transmission unit includes a plurality of solar lines being in communication with said solar collector;
said light transmission unit includes a plurality of artificial lines being in communication with said control panel;
said light transmission unit includes a plurality of first supply lines and a plurality of second supply lines;
each of said plurality of solar lines associated with said light transmission unit is coupled to said solar input of a respective one of said switch receivers such that each of said plurality of solar lines is in electromagnetic communication with said solar input of said respective switch receiver wherein each of said plurality of switch receivers is configured to receive the sunlight from said solar collector;
each of said plurality of artificial lines associated with said light transmission unit is coupled to said artificial input of a respective one of said switch receivers such that each of said plurality of artificial lines is in electromagnetic communication with said artificial input of said respective switch receiver wherein each of said plurality of switch receivers is configured to receive the sunlight from said artificial collector;
each of said first supply lines associated with said light transmission unit is coupled to said solar output of a respective one of said switch receivers such that each of said first supply lines is in electromagnetic communication with said solar output of said respective switch receiver wherein each of said first supply lines is configured to receive the sunlight from said solar collector; and
each of said second supply lines associated with said light transmission unit is coupled to said solar output of a respective one of said switch receivers such that each of said second supply lines is in electromagnetic communication with said solar output of said respective switch receiver wherein each of said second supply lines is configured to receive the sunlight from said solar collector.

14. The assembly according to claim 13, wherein:
each of said plurality of light fixtures has a first input and a second input; and
said first input of each of said plurality of light fixtures is coupled to a respective one of said first supply lines associated with said light transmission unit such that first input of each of said light fixtures is in electromagnetic communication with said respective switch receiver wherein each of said plurality of light fixtures is configured to receive the sunlight from said respective switch receiver.

15. The assembly according to claim 13, wherein:
each of said plurality of light fixtures has a first input and a second input; and
said second input of each of said light fixtures is coupled to a respective one of said second supply lines associated with said light transmission unit such that second input of each of said plurality of light fixtures is in electromagnetic communication with said respective switch receiver wherein each of said plurality of light fixtures is configured to receive the artificial from said respective switch receiver.

16. The assembly according to claim 9, wherein each of said plurality of switches has an output, said output of each of plurality of switches being electrically coupled to said switch input on said control panel, said control circuit in said control panel receiving said actuate input when any of said plurality of switches is turned on, said plurality of solar shutters and said plurality of artificial shutters in said switch receiver associated with said switch that is turned on being actuated into said open condition based on lighting conditions determined by said control panel wherein said switch receiver associated with said switch that is turned on is configured to direct the sunlight or the artificial light through said switch receiver.

17. The assembly according to claim 1, wherein:
each of said plurality of light fixtures has a first input and a second input; and
each of said plurality of light fixtures has a lens being in electromagnetic communication with each of said first input and said second input wherein said lens associated with said plurality of light fixtures is configured to emit the sunlight and the artificial light into said respective room to illuminate said respective room.

18. A lighting control assembly for mixing solar light and artificial light for illuminating rooms in a building, said assembly comprising:
a solar collector being integrated into a roof of a building wherein said solar collector is configured to collect sunlight, said solar collector including a light sensor being configured to sense sunlight;
a light transmission unit being integrated into said building, said light transmission unit being in communication with said solar collector wherein said light transmission unit is configured to receive the sunlight from said solar collector, said light transmission unit including:
a trunk line being coupled to an output of said solar collector wherein said trunk line is configured to receive the sunlight, said trunk line being comprised of a light transmitting material wherein said trunk line is configured to transmit the sunlight along said trunk line;
a plurality of solar lines, said plurality of solar lines having a common input, each of said plurality of solar lines being integrated into said building, each of said plurality of solar lines being comprised of a light transmitting material wherein each of said plurality of solar lines is configured to transmit light;
a plurality of artificial lines, each of said plurality of artificial lines having a common input, each of said plurality of artificial lines being integrated into said building, each of said plurality of artificial lines being comprised of a light transmitting material wherein each of said plurality of artificial lines is configured to transmit light;
a plurality of first supply lines, each of said plurality of first supply lines being integrated into said building, each of said plurality of first supply lines being comprised of a light transmitting material wherein each of said plurality of first supply lines is configured to transmit light; and
a plurality of second supply lines, each of said plurality of second supply lines being integrated into said building, each of said plurality of second supply lines being comprised of a light transmitting material wherein each of said plurality of second supply lines is configured to transmit light;
a control panel being attached to said building, said control panel having a solar pathway and an artificial pathway, said solar pathway being in communication with said light transmission unit wherein said solar pathway is configured to receive the sunlight from said solar collector, said control panel having a light emitter being integrated within said control panel wherein said light emitter is configured to emit artificial light within said control panel, said light emitter being in communication with said artificial pathway wherein said artificial pathway is configured to receive the artificial light from said light emitter, said artificial pathway being in communication with said light transmission unit wherein said light transmission unit is configured to receive the artificial light from said light emitter, said control panel having a solar input and a solar output and an artificial output, said solar pathway being in electromagnetic communication between said solar input and said solar output, said artificial pathway being in electromagnetic communication with said artificial output, said solar pathway including a series of first mirrors being disposed within said control panel, said series of first mirrors being strategically oriented for reflecting light from said solar input to said solar output, said artificial pathway including a series of second mirrors being disposed within said control panel, said series of second mirrors being strategically oriented for reflecting light from said light emitter to said artificial output, said trunk line associated with said light transmission unit being coupled to said solar input such that said trunk line is in electromagnetic communication with said solar pathway wherein said solar pathway is configured to receive the sunlight from said solar collector, said common input of said plurality of solar lines associated with said light transmission unit being coupled to said solar output such that said plurality of solar lines is in electromagnetic communication with said solar pathway wherein said plurality of solar lines is configured to receive the sunlight from said solar collector, said common input of said plurality of artificial lines associated with said light transmission unit being coupled to said artificial output such that said plurality of artificial lines is in electromagnetic communication with said artificial pathway wherein said plurality of artificial lines is configured to receive the light from said light emitter, said control panel having a switch input, said control panel having a switch receiver input, said control panel having a control circuit being integrated into said control panel, said control circuit being electrically coupled to a power source comprising an electrical system of said building, said control circuit being electrically coupled to each of said switch input and said switch receiver input, said control circuit being electrically coupled to said light emitter, said control circuit being electrically coupled to said light sensor in said solar collector, said control circuit receiving a solar input when said light sensor senses sunlight, said control circuit receiving a mixture input when said light sensor senses sunlight that is below a pre-determined intensity, said control circuit receiving an artificial input when said light sensor does not sense sunlight, said control circuit receiving an actuate input, said light emitter being turned off when said control circuit receives said solar input, said light emitter being turned on to a pre-determined intensity that is less than a full intensity of said light emitter when said control circuit receives said mixture input, said light emitter being turned on to said full intensity when said control circuit receives said artificial input, said control panel including a power supply being mounted within said control panel comprising at least one battery being electrically coupled to said control circuit for supplying emergency back-up power to said control circuit;

a plurality of switch receivers, each of said switch receivers being integrated into said building at strategic locations in said building, each of said switch receivers being in communication with said light transmission unit wherein each of said plurality of switch receivers is configured to receive the sunlight and the artificial light from said light transmission unit, each of said switch receivers being in communication with said control panel, each of said switch receivers being actuatable between an on condition and an off condition, each of said plurality of switch receivers being normally actuated into said off condition, each of said plurality of switch receivers having a solar input and an artificial input, each of said plurality of switch receivers having a solar output and an artificial output, each of said switch receivers having a communication input, each of said switch receivers having a plurality of solar shutters being in communication between said solar input and said solar output of a respective switch receiver, each of said switch receivers having a plurality of artificial shutters being in communication between said artificial input and said artificial output of a respective switch receiver, said communication input of each of said plurality of switch receivers being electrically coupled to said switch receiver input of said control panel, each of said plurality of solar shutters associated with said respective switch receiver being actuated into an open condition when said control circuit receives said actuate input and said control circuit receives said solar input wherein said plurality of solar shutters associated with said respective switch receiver is configured to pass sunlight through said respective switch receiver, each of said artificial shutters associated with a respective one of said switch receivers being actuated into an open condition when said control circuit receives said actuate input and said control circuit receives either of said mixture input or said artificial input wherein said respective switch receiver is configured to pass the artificial light through said respective switch receiver;

wherein each of said plurality of solar shutters in a respective one of said switch receivers is in communication between said solar input and said solar output of said respective switch receiver;

wherein each of said plurality of artificial shutters in a respective one of said switch receivers is in communication between said artificial input and said artificial output of said respective switch receiver;

wherein said communication input of a respective one of said switch receivers is electrically coupled to each of said plurality of solar shutters and each of said plurality of artificial shutters in said respective switch receiver;

wherein each of said plurality of solar lines associated with said light transmission unit is coupled to said solar input of a respective one of said switch receivers such that each of said plurality of solar lines is in electromagnetic communication with said solar input of said respective switch receiver wherein each of said plurality of switch receivers is configured to receive the sunlight from said solar collector;

wherein each of said plurality of artificial lines associated with said light transmission unit is coupled to said artificial input of a respective one of said switch receivers such that each of said plurality of artificial lines is in electromagnetic communication with said artificial input of said respective switch receiver wherein each of said plurality of switch receivers is configured to receive the sunlight from said artificial collector;

wherein each of said first supply lines associated with said light transmission unit is coupled to said solar output of a respective one of said switch receivers such that each of said first supply lines is in electromagnetic communication with said solar output of said respective switch receiver wherein each of said first supply lines is configured to receive the sunlight from said solar collector;

wherein each of said second supply lines associated with said light transmission unit is coupled to said solar output of a respective one of said switch receivers such that each of said second supply lines is in electromagnetic communication with said solar output of said respective switch receiver wherein each of said second supply lines is configured to receive the sunlight from said solar collector;

a plurality of switches, each of said plurality of switches being positioned in respective room of said building thereby facilitating each of said plurality of switches to be manipulated, each of said plurality of switches being in communication said control panel, each of said plurality of switches being in communication with a respective one of said switch receivers, said switch receiver associated with a respective one of said switches being actuated into said on condition when said respective switch is turned on, each of said plurality of switches having an output, said output of each of plurality of switches being electrically coupled to said switch input on said control panel, said control circuit in said control panel receiving said actuate input when any of said plurality of switches is turned on, said plurality of solar shutters and said plurality of artificial shutters in said switch receiver associated with said switch that is turned on being actuated into said open condition based on lighting conditions determined by said control panel wherein said switch receiver associated with said switch that is turned on is configured to direct the sunlight or the artificial light into a respective first supply line and a respective second supply line associated with said light transmission unit; and a plurality of light fixtures, each of said light fixtures being mounted in a respective room in said building, each of said plurality of light fixtures being in communication with a respective one of said switch receivers wherein each of said plurality of light fixtures is configured to receive the sunlight and the artificial light from said respective switch receiver for illuminating said respective room when said respective switch receiver is actuated into said on condition, each of said light fixtures having a first input and a second input, said first input of each of said light fixtures being coupled to a respective one of said first supply lines associated with said light transmission unit such that first input of each of said light fixtures is in electromagnetic communication with said respective switch receiver wherein each of said plurality of light fixtures is configured to receive the sunlight from said respective switch receiver, said second input of each of said light fixtures being coupled to a respective one of said second supply lines associated with said light transmission unit such that second input of each of said light fixtures is in electromagnetic communication with said respective switch receiver wherein each of said plurality of light fixtures is configured to receive the artificial from said respective switch receiver, each of said plurality of light fixtures having a lens being in electromagnetic communication with each of said first input and said second input wherein said lens associated with said plurality of light fixtures is configured to emit the sunlight and the artificial light into said respective room to illuminate said respective room.

* * * * *